(12) United States Patent
Pieri (10) Patent No.: US 12,104,502 B2
(45) Date of Patent: Oct. 1, 2024

(54) METHOD FOR GIVING SHROUD INTERFERENCE TO AXIAL-ENTRY BLADES IN A ROTARY MACHINE AND ROTARY MACHINE

(71) Applicant: NUOVO PIGNONE TECNOLOGIE—SRL, Florence (IT)

(72) Inventor: Marco Pieri, Florence (IT)

(73) Assignee: Nuovo Pignone Tecnologie—SRL, Florence (IT)

( * ) Notice: Subject to any disclaimer, the term of this patent is extended or adjusted under 35 U.S.C. 154(b) by 0 days.

(21) Appl. No.: 17/904,651

(22) PCT Filed: Feb. 18, 2021

(86) PCT No.: PCT/EP2021/025060
§ 371 (c)(1),
(2) Date: Aug. 19, 2022

(87) PCT Pub. No.: WO2021/170294
PCT Pub. Date: Sep. 2, 2021

(65) Prior Publication Data
US 2023/0093896 A1 Mar. 30, 2023

(30) Foreign Application Priority Data
Feb. 25, 2020 (IT) .................. 102020000003895

(51) Int. Cl.
*F01D 5/22* (2006.01)
*B23P 15/00* (2006.01)
(Continued)

(52) U.S. Cl.
CPC .......... *F01D 5/225* (2013.01); *F01D 5/3007* (2013.01); *F01D 5/326* (2013.01); *B23P 15/006* (2013.01);
(Continued)

(58) Field of Classification Search
CPC .......... F01D 5/225; F01D 5/3007; F01D 5/32; F01D 5/323; F01D 5/326; F05D 2230/60;
(Continued)

(56) References Cited

U.S. PATENT DOCUMENTS 3,045,329 A * 7/1962 Carli ...................... F01D 5/323
29/513
3,702,222 A * 11/1972 Bernales ............... F01D 5/3007
416/193 A
5,146,679 A * 9/1992 Ortolano ................. B23P 6/007
29/889.7

(Continued)

FOREIGN PATENT DOCUMENTS

| EP | 3269927 A1 | 1/2018 |
| JP | 59-108805 A | 6/1984 |
| JP | 2007064074 A | 3/2007 |
| JP | 2010501765 A | 1/2010 |
| JP | 2012036893 A | 2/2012 |

*Primary Examiner* — Christopher Verdier
(74) *Attorney, Agent, or Firm* — Paul Frank + Collins P.C.

(57) ABSTRACT

A rotary machine assembly for a turbomachine, such as a rotor, having a rotor wheel where a plurality of circumferentially spaced female dovetail slots are obtained. The rotary machine assembly also comprises a plurality of blades. Between each blade and the adjacent one there is an interface angle. Each blade comprises a male dovetail, configured to fit with a corresponding female dovetail slot of the rotor wheel along an insertion direction. The female dovetail slots are shaped so that the insertion direction of each male dovetail is convergent with the rotation axis of the rotor wheel, so as to form with it an insertion angle, so as to insert gradually all the male dovetails into the female dovetail slots and packing them also gradually. A method for assembling a rotary machine assembly, which does not require any specific tool, is also disclosed.

19 Claims, 8 Drawing Sheets

(51) Int. Cl.
 *B23P 15/04* (2006.01)
 *F01D 5/30* (2006.01)
 *F01D 5/32* (2006.01)
(52) U.S. Cl.
 CPC .......... *B23P 15/04* (2013.01); *F05D 2220/31* (2013.01); *F05D 2230/60* (2013.01); *F05D 2240/242* (2013.01); *F05D 2240/30* (2013.01); *Y10T 29/49321* (2015.01); *Y10T 29/49945* (2015.01)
(58) Field of Classification Search
 CPC ........... F05D 2250/314; F05D 2220/31; Y10T 29/49321; Y10T 29/49323; Y10T 29/49945; B23P 15/04; B23P 15/006
 See application file for complete search history.

(56) References Cited

U.S. PATENT DOCUMENTS

| | | |
|---|---|---|
| 5,310,318 A | 5/1994 | Lammas et al. |
| 8,192,167 B2 | 6/2012 | Helmis et al. |
| 2003/0012655 A1* | 1/2003 | Sasaki ............... F01D 5/225 |
| | | 416/219 R |
| 2005/0249599 A1 | 11/2005 | Hemsley et al. |
| 2006/0222501 A1* | 10/2006 | Nogami ............ F01D 5/3007 |
| | | 416/219 R |
| 2008/0193293 A1* | 8/2008 | Greenberg ........... F01D 25/285 |
| | | 416/193 A |
| 2017/0081963 A1 | 3/2017 | Batt et al. |
| 2017/0114799 A1 | 4/2017 | Chanez |
| 2018/0016920 A1* | 1/2018 | Chung ................ F01D 5/16 |
| 2019/0249555 A1* | 8/2019 | Yagi .................. F01D 5/225 |

\* cited by examiner

METHOD FOR GIVING SHROUD INTERFERENCE TO AXIAL-ENTRY BLADES IN A ROTARY MACHINE AND ROTARY MACHINE

TECHNICAL FIELD

The present disclosure concerns a method for giving shroud interference to axial-entry rotor blades in a rotary machine, particularly a steam turbine, and rotary machine, wherein the rotary member of the rotary machine, such as a rotor, is obtained by such a method.

Background Art

Electrical power has become more and more important in the modern society. It is estimated that the main part of the electricity is generated by steam turbines, which are rotary machines.

A steam turbine is a device that extracts thermal energy from pressurized steam and uses it to do mechanical work on a rotating output shaft. A steam turbine gives the better thermodynamic efficiency by using multiple stages in the expansion of steam. With such a substantial amount of electrical energy being produced by steam turbine generators, it is in the best interest of society to make these generators as efficient as possible.

One of the key factors influencing the efficiency of the steam turbines, and in general of rotary machines, are the turbine blades. This is particularly true considering that, to increase the efficiency of the rotary machine, the relevant rotors are currently rotated at a very high speed, which causes several design and operational drawbacks.

More specifically, steam turbines are usually made of several operating stages, distinguished from each other depending on the steam conditions the rotor is subject to.

It is well known that each stage comprises at least a stator and a rotor. Stators and rotors comprise blades, for deviating the steam flux and causing the rotation of the rotor.

The blades, and particularly the rotor blades, are subject to variable pressure distributions, while rotating. Therefore, the blades are subject to remarkable mechanical and dynamical stresses on the airfoil surface during their rotation, which can be different along the length of the blade itself.

Based on the above, in blade design the preventing of freestanding behavior of the blade is usually required, to ensure an improved efficiency of the rotary machine. To keep the blades in position at operational speed airfoil covers, also known as shrouds, are used in order to keep the blades connected each other.

However, it is also known that at operational speed, the blades of the rotor tend to elongate. This is known as the centrifugal elongation of the rotor blades. This phenomenon causes that the airfoil shroud moves to a larger diametral position, and consequently larger pitch of each rotor blade. This causes that the airfoil shrouds are no longer in contact with the neighboring ones and become free at high rotational speed, thus again subject to the variable pressure field effects. Then, it is desirable that the blades remain in contact at operational speed. In addition, also the three dimensionality of a profile at high speed entails the untwisting phenomenon, namely the loss of contact or interference between shrouds.

To overcome this drawback, the airfoil shroud includes some extra material, or stock material, enough to keep the airfoil shroud of each blade in connection with the adjacent ones.

This solution actually works properly; however, in the realization or assembling operations of the rotor this arrangement causes several constructional and operational drawbacks.

In particular, each blade usually comprises a root, having a male dovetail portion, designed to be inserted in a respective female dovetail portion obtained in the rotor groove, an airfoil, for intercepting the steam flux, and, at the top of the airfoil, the airfoil shroud, mentioned above. For assembling the rotor, the male dovetail of the blades has to be inserted in a respective female dovetail machined along the perimeter of the rotor wheel. The blade construction and the row assembly is such to provide shroud interference between the neighboring blades. Several coupling systems are known in the prior art, such as tangential T-root and axial fir-tree-root. The latter solution, in its turn, may require complex additional blade machining, special tooling and assembly procedures, since the blades shrouds must be assembled in such a way that at least during operation all the blades shroud are in contact. In addition, the insertion of the last blade of the array is some time very troublesome and difficult.

Several solutions have been proposed in the prior art in order to overcome the above technical problem. Examples of methods for axially inserting blades into female dovetail-shaped slots of a rotor wheel are disclosed for example in and U.S. Pat. No. 9,689,268 B2, which anyway require several manufacturing hurdles.

For instance, also, a solution according to the prior art was put forward featuring special shroud shapes to be interlocked. However, this solution needs special blade machining and it has been found difficult to measure and eventually adjust blades at an assembly step. In addition, the solution showed a complex blade assembly and a not uniform shroud interference. Finally, to assemble the blades in the rotor wheel, a specific assembly equipment is needed and specific training is required for it.

In another solution of the prior art, a shroud interference method has been applied. It concerns a Z-shaped lock system, which locks the airfoil shroud. The airfoil shroud is then assembled with clearance and interference is obtained at high rotating speed due to rotor blade un-twisting. However, this solution needs blades with a quite complex shroud geometry, which in its turn entails a complex blade machining and a remarkable manufacturing cost.

In another solution according to the prior art, a friction damping device is interlocked between two adjacent shrouds. This damping device causes the shrouds to remain mechanically connected, even in case of the above-mentioned phenomenon of rotor blade elongation.

However, also in this case, this solution entails a complex geometry of the shrouds, which have to house the damping devices. In its turn, it requires a very complex blade machining. Also, an additional component, namely the damping device, is added to the rotor, thus increasing the complexity of the assembly.

SUMMARY

An improved rotor assembly and an assembly method capable of overcoming the drawbacks and the technical problems of the prior art would be welcomed in the technology. More in general, it would be desirable to provide an assembly method which can be obtained without an undue complication of the blades' shape, especially of the base and the airfoil shroud, and which does not need the addition of any component.

It is also desirable to have an axial-entry rotor blade system, which is capable to retain very high centrifugal loads and/or support severe steam conditions, like the low pressure blades, the impulse/control stage blades or the high and intermediate pressure section stage blades.

It is also desirable to have an easy, cheap and robust way of giving shroud interference to the rotor blades row.

In one aspect, the subject matter disclosed herein is directed to a rotary member assembly for a turbomachine, including a rotor wheel, intended to rotate around a rotation axis. The rotor wheel has a plurality of circumferentially spaced female dovetail-shaped milled slots about its rim with axial entry direction or with a predominantly axial entry direction. In addition, the rotary member assembly comprises a plurality of blades, for intercepting the fluid stream of a turbomachine.

Each blade comprises a male or first dovetail, to fit with corresponding female or first dovetail slots of the rotor wheel, along an insertion direction axial or angled with respect the rotation axis of the rotor wheel. This angle is conventionally defined at a skew angle.

Each male dovetail inserts into a corresponding female dovetail slot along an insertion direction, which is convergent with the rotation axis of the rotor wheel, forming with it an insertion angle. This angle will be herein named convergence angle.

In another aspect, the subject matter disclosed herein, the insertion direction along which each male dovetail is inserted in the respective female dovetail slots is not parallel to a plane containing the rotation axis of the rotor wheel.

In another aspect, disclosed herein is a blade, which comprises an airfoil, an airfoil shroud, fixed to the free end of the airfoil. Each airfoil shroud of each blade provides a stock material, so as to interfere with adjacent shrouds, at least when the male dovetail is completely inserted in the respective female dovetail slots of the rotor wheel.

A further aspect of the present disclosure is drawn to a method for assembling a rotary member assembly, wherein all the male dovetails are initially partially inserted into a respective female dovetail slot, and then, after that all the blades are at least partially inserted in a relevant female dovetail slot, all the male dovetails are gradually inserted, until all the male dovetail of each blade is completely inserted in the respective female dovetail slot. In fact, during the insertion, the shroud interference increases. The dovetail joint provides force reaction to the shroud interference.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

The inventor(s) are believed to have discovered a new and useful method for assembling the blades of a rotor of a steam turbine. The solution is achieved by inserting the male dovetail of each blade in a corresponding female dovetail slot of the rotor wheel of the rotor, with an insertion angle designed to pack the blades of the steam turbine, without modifying some blades and/or any additional connecting structure.

In particular, the rotary machine obtained thereby is capable of providing shroud interference to axial-entry blades, (or with predominant axial direction of insertion) even with skewed shroud design (i.e. rhomboid shape of the airfoil shroud) on a rotary machine.

More specifically, by means of a geometrical feature of both the female dovetail slots (also commonly known as axial machined groove) of the rotor wheel of a rotary member and the male dovetail (also known as blade root), and in particular of the convergence angle between the sliding direction and the rotor axis vector and the skew angle between the rotation axis and the insertion direction on a plane tangent to rotor diameter and the interface angle between adjacent shrouds, a reduced pitch during the blade insertion can be obtained.

The method is intended to provide shroud interference to the blades in a rotary member of rotary machines, such as the rotors of a steam turbine. The shroud is a cover placed on the free end of the airfoil of a blade. It can have different shapes, so as to keep the blades properly connected during the rotation of the rotary member of a rotor, with the shrouds of the neighboring blades. The shrouds are made from a forged bar milled so as to achieve the airfoil, the shroud and the male dovetail. The shroud is subjected to the same thermodynamic conditions of the airfoil. Between the rotor shroud cover ring and the stator seals there is small clearance to minimize any leakage of the working fluid (steam, gas . . . ).

In accordance to an aspect of the subject matter disclosed herein, whenever the male dovetail of a blade is inserted in a female dovetail slot, which is complementary to the first, realized on the rotor wheel perimeter, the insertion trajectory is not parallel to the rotation axis of the rotor wheel, but it is both inclined with respect to (namely, the insertion trajectory does not lay on the same plane where the rotation axis of the rotor wheel lays too), and convergent toward the rotational axis of the rotor wheel, reducing the tangential pitch of blades. Furthermore, the interface angle between the airfoil shrouds is suitably sized. During insertion, the airfoil shrouds overcome between them firstly clearance, contact, and then interference. In this way, in order to assemble a rotor wheel, it is possible partially inserting the male dovetails of all the blades of the rotor assembly, or of a rotary member in general, in a respective female dovetail or groove of the rotor wheel, preventing an excess of interference of each shroud with the neighboring ones, during the insertion process of the blades, so as to complete the insertion of all the blades almost together, so as to cause a uniform and distributed interference among the shrouds. In this way, the airfoil shrouds result packed and the airfoils of the blades are prevented to bend in freestanding mode when subject to a pressure field while the rotor assembly is in use.

This method allows a gradual insertion of each blade's male dovetail in the respective female dovetail slot of the rotor wheel of the rotor assembly. Hence, also a control of the interference of the airfoil shroud of each blade, which packs each other, is obtained, along with a simplified assembling, where also no specific assembling tools or set up are required.

As used herein, the terms "axial" and "axially" refer to directions and orientations extending substantially parallel to a longitudinal axis of a steam turbine engine. Moreover, the terms "radial" and "radially" refer to directions and orientations extending substantially perpendicular to the longitudinal axis of the steam turbine engine, namely of the rotation axis of the rotor assembly. In addition, as used herein, the terms "circumferential" and "circumferentially" refer to directions and orientations extending arcuately about the longitudinal axis of the rotary machine.

Referring now to the drawings, FIGS. 1, 2, 3 and 4 show a rotary member of a rotary machine, and in particular, a rotor assembly 1, which is intended, without limiting the scope of the solution herein disclosed, for instance, to be installed in a steam turbine (not shown in the figures). The solution applied to the rotor assemblies 1 herein disclosed according to the embodiments illustrated can be also applied to rotary machines of other type of turbines, such as gas turbines and the like.

The rotor assembly 1 comprises a rotor wheel 2, which is substantially disk shaped. The rotor wheel 2 has an axis of rotation, indicated with the reference letter R, about which it rotates when in use.

The rotor wheel also comprises a plurality of blades 3, mechanically connected to the circumference of the rotor wheel 2, as better disclosed in the following.

The rotor wheel 2 also has a plurality of circumferentially spaced female dovetail slots (or grooves) 21. The female dovetail slots 21 are circumferentially spaced one from the other about the peripheral margin or rim 22 of the rotor wheel 2.

As it can be seen, the female dovetail slots 21 are fir-tree shaped, so as to better engage with a corresponding male part or male dovetail, which is better described below. In other embodiments, the female dovetail slots 21 may have a different shape. In any case, the shape of the substantially axial slots or grooves is in general such that they firmly keep the blade mechanically connected to the rotor wheel 2, to counterbalance the force the blades 3 are subject to while operating, since, as discussed in the preamble, the blades 3 are subject to centrifugal force while the rotor wheel 2, to which the blades 3 are connected to, rotates.

The female dovetail slots 21 are uniformly spaced about the rotor wheel rim 22, so are consequently the blades 3 connected thereto.

Each blade 3 of the rotor assembly 1 comprises a platform 31, having a male dovetail 32 (also commonly called root). Each male dovetail 32 has in its turn a fir-tree shape, which complements a female dovetail slot 21, so as to fit with it. More specifically, the male dovetail 32 is intended to be inserted in the female dovetail slot 21, as better explained below.

The blade 3 also comprises an airfoil 33, intended to intercept the steam and having a first end 331 and a second end 332. The first end 331 of the airfoil 3 is coupled to the platform 31.

The blade 3 also comprises an airfoil shroud 34, fixed to the second end 332 of the airfoil 33.

In the embodiment illustrated in the figures, the airfoil shroud 34 has a rhomboid shape, thus the insertion direction indicated with the capital letter I has a convergence angle $\alpha$ and a skew angle $\beta$ greater than zero. More specifically, in use the airfoil 33 of each blade 3 is stressed by the pressure field of the steam, which, as is well known, is usually variable, namely non-uniform over the perimeter of the rotor assembly 1. Owing to the rhomboidal shape of each airfoil shroud 34, in case of the airfoil 2 of two neighboring blades 3 are subject to quite different stresses, the movement of a first blade 3 is damped, blocked or at least contained by the "anchoring" effect of the second blade 3, which tends to keep the first blade 3 because of the connection of the airfoil shroud 34.

In other embodiments, the airfoil shroud 34 may have different shapes. More specifically, the airfoil shroud 34 may have the so-called z-lock shape on the mate side where it contacts the adjacent airfoil shroud 34.

The same effect applies in case of the skew angle $\beta$ is zero and the airfoil shrouds 34 are thus rectangular instead of rhomboidal.

Each airfoil shroud 34 of each blade 3 provides a stock material, so as to interfere, at least when the male dovetail 32 is completely inserted in the respective female dovetail slots 21 of the rotor wheel 2. The stock material ensures that each airfoil shroud 34 remains engaged with the neighboring ones even in case of centrifugal elongation of the rotor blades 3 while the rotor assembly 1 rotates, and even in case of airfoil untwisting.

With stock material, in the field also referred to as extra material, is meant that each shroud 34 has an effective dimension larger than the theoretical one. In other words, the stock material or extra material is the difference between the actual pitch of a shroud 34 and the theoretical pitch, the latter obtainable as the circumference of the shroud array formed by all the shrouds 34, divided by the number of the blades 3.

Figure 1:
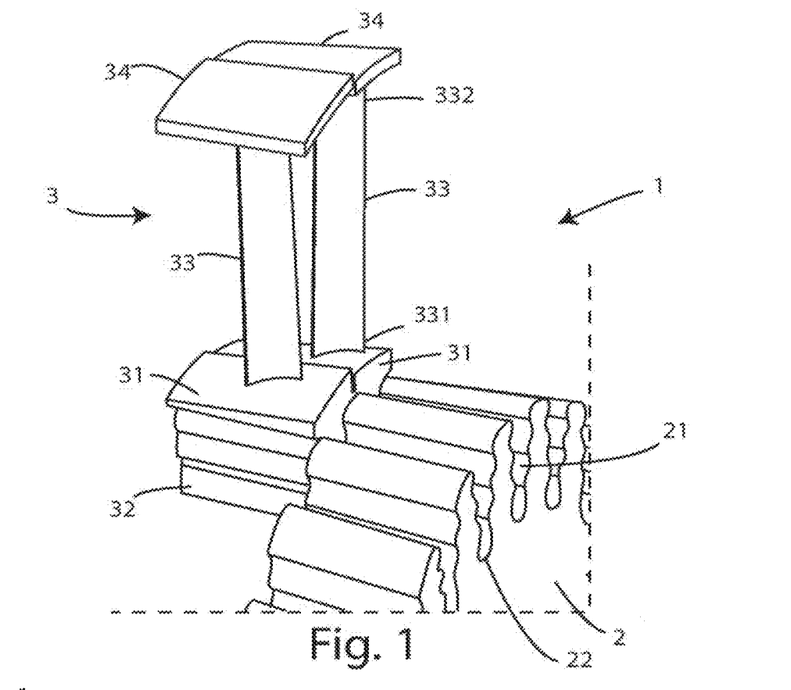
FIG. 1 illustrates a perspective exploded view of a rotor blade assembly according to a first embodiment.
Figure 2:
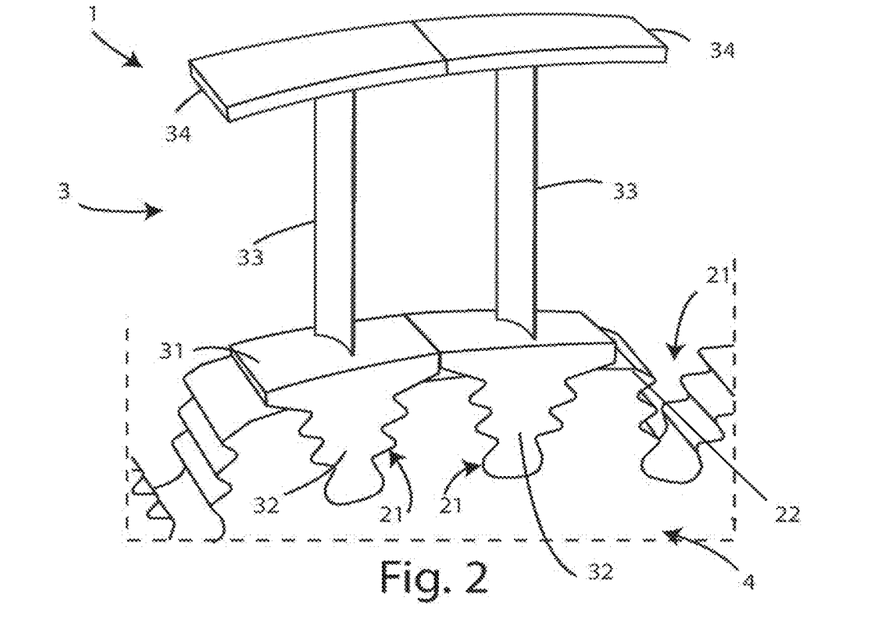
FIG. 2 illustrates an additional perspective assembled view of the rotor blade assembly according to the first embodiment.
Figure 3:
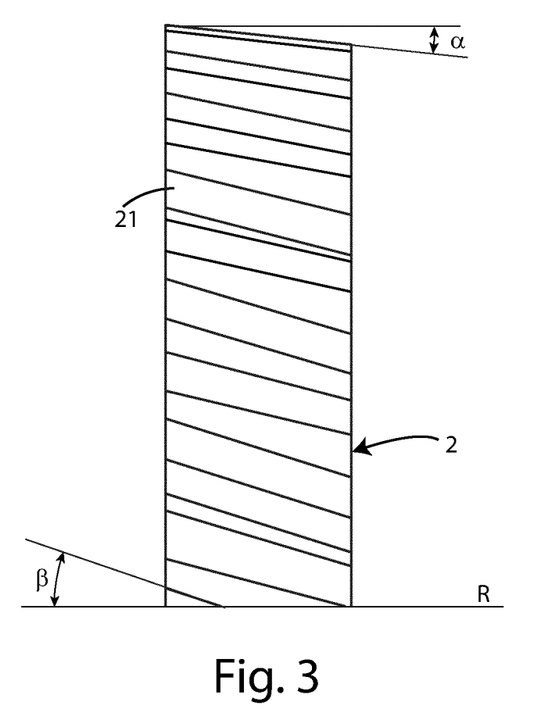
FIG. 3 illustrates a top view of the rotor wheel of the machined rotor without assembly of blades according to the first embodiment.
Figure 4:
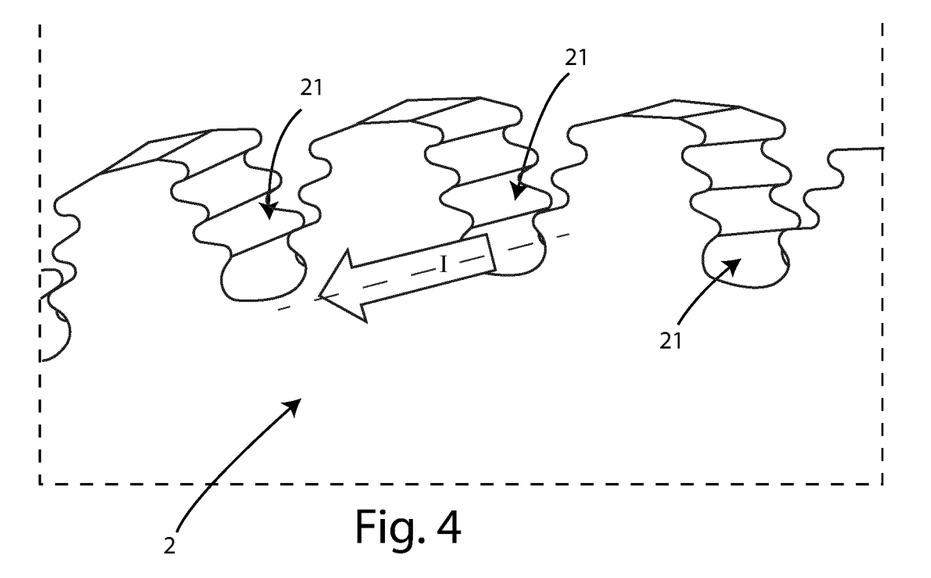
FIG. 4 illustrates a front view of a detail of the female dovetail slots of the rotor wheel of FIG. 3.

In a first embodiment, and referring in particular referring to FIG. 3 and FIG. 4, the female dovetail slots 21 are shaped in order to allow an insertion direction of the male dovetail 32 along an insertion axis or direction, indicated with the letter I, which is converging toward the rotation axis of the rotor wheel 2 and, at the same time, lays in a plane that does not contain the rotation axis R of the rotor wheel 2. In other words, the rotation axis R of the rotor wheel 2 and the insertion axis or direction I lie in nonparallel planes. Insertion along the direction I determines closer radial distance of blade with respect to rotor wheel axis R, thus obtaining a reduction of pitch and increase of shroud interference.

With reference to FIGS. 5, 6, 7 and 8, it is shown the orientation of the plane orthogonal to the insertion direction I of the male dovetail 32 into the female dovetail slot 21.

Figure 5:
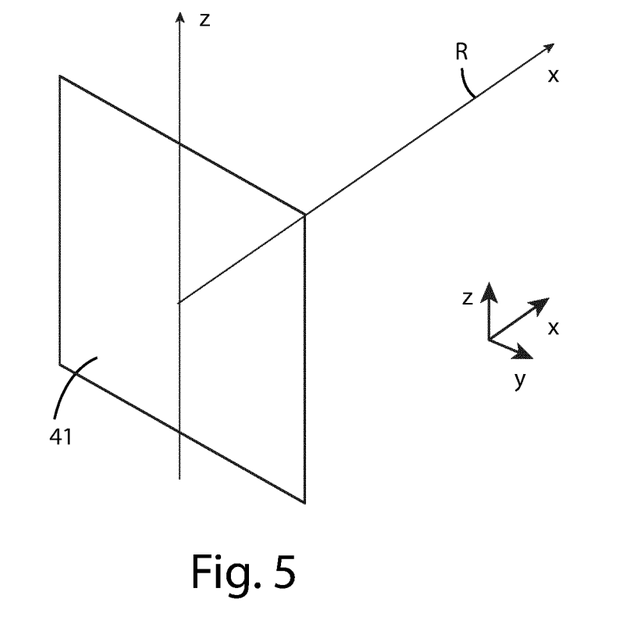
FIG. 5 illustrates a plane normal to the rotation axis of the rotor wheel (X direction) according to the first embodiment.

In particular, FIG. 5 shows the plane 41, normal to the rotation axis R of the rotor wheel 2, wherein the rotation axis R is aligned to the X-axis of a Cartesian frame of three XYZ perpendicular axes.

Figure 6:
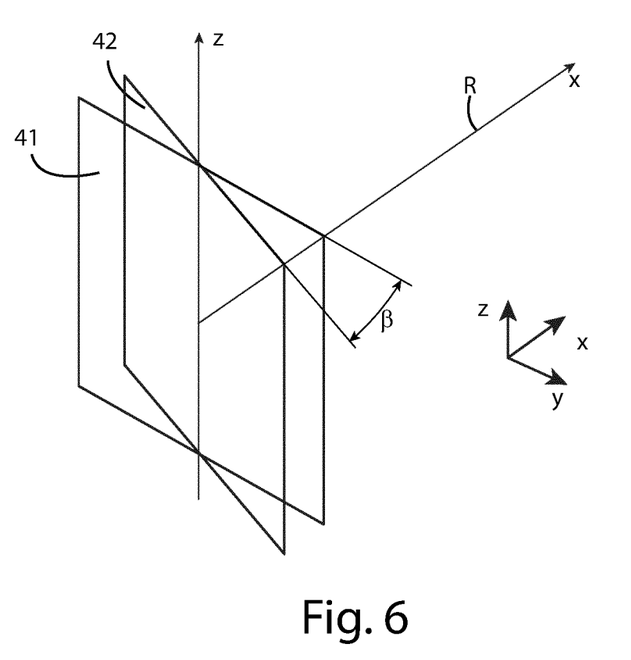
FIG. 6 illustrates a skew plane according to the first embodiment, where the skew plane is obtained as a rotation of the plane normal to the rotation axis about the radial direction (z direction), the amount of rotation is named skew angle and is illustrated.

FIG. 6 shows a skew plane 42, obtained rotating the normal plane 41 of a first angle around Z-axis. Also, in FIG. 7, on the intersection of planes 42 and 41, at Z distance corresponding to radial position of 21, the point P is positioned. The angle between the normal plane 41 and the skew plane 42 is the skew angle $\beta$.

Figure 7:
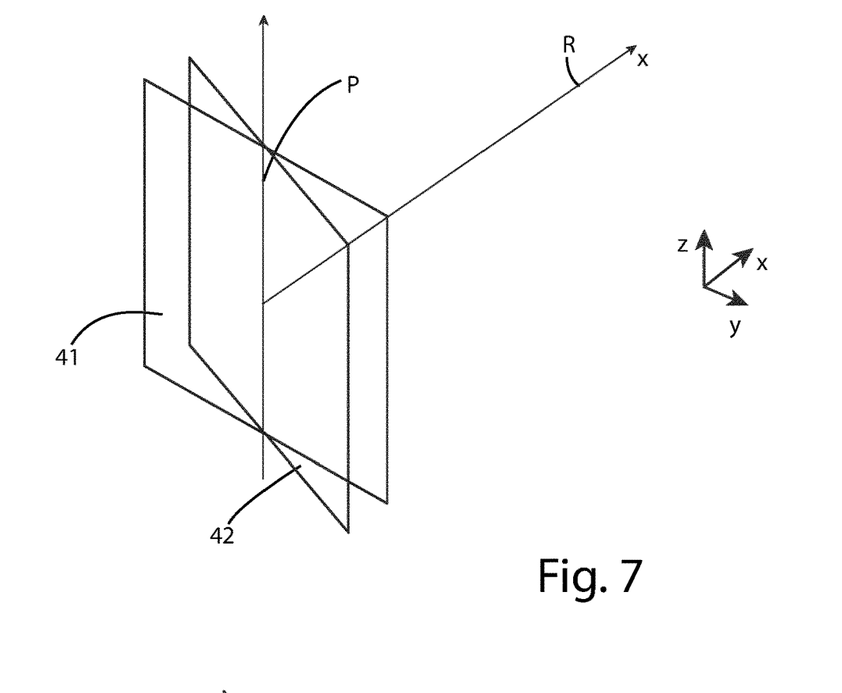
FIG. 7 illustrates the point P according to the first embodiment, located on the radial axis Z at a radial coordinate corresponding to the rotor blade root reference coordinate, where an axis C according to the first embodiment passes through point P, is contained on the skew plane and normal to z-axis.

FIG. 7 shows a convergence axis C which passes in point P, and is contained in plane 42 (skew), and is contained also in a plane parallel to the Cartesian axes X and Y, namely at Z equal to constant (the same which contains point P). Point P in FIG. 7 is located at the radial distance of the slot with respect to the rotor axis.

Figure 8:
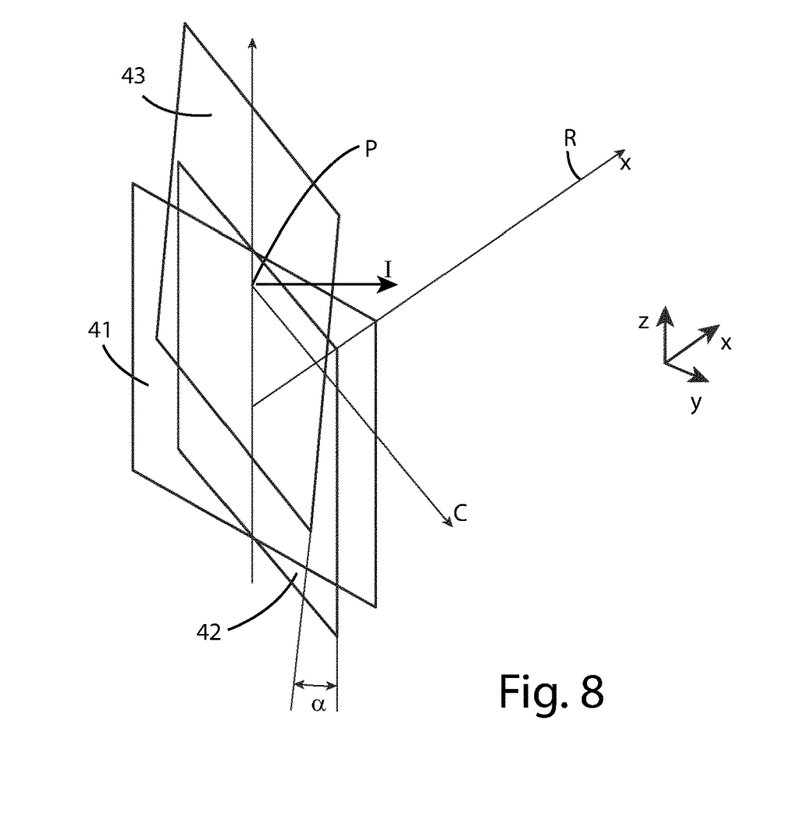
FIG. 8 illustrates a new plane according to the first embodiment, named convergence plane which is obtained by the rotation of the skew plane about an axis, where the amount of rotation is named convergence angle and is illustrated.
Figure 9:
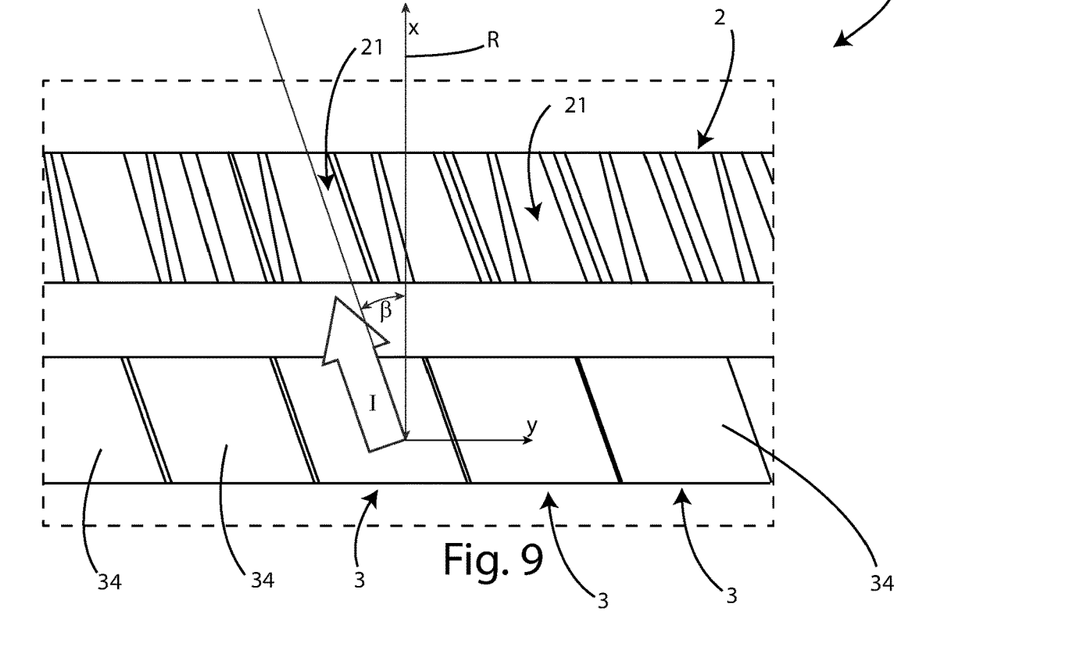
FIG. 9 illustrates a top view of the rotor wheel and the blades before their insertion in the female dovetail slots, according to the first embodiment.
Figure 10:
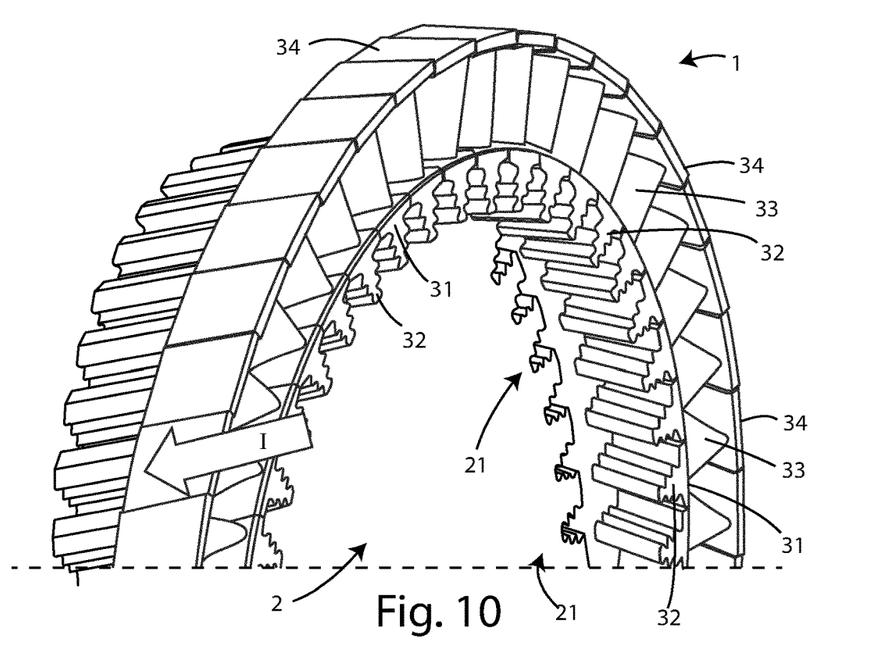
FIG. 10 illustrates a perspective view of the rotor wheel and the blades before their insertion in the female dovetail slots, according to the first embodiment.

Finally, FIG. 8 shows a convergence plane 43, obtained as rotation of skew plane 42 around convergence axis C. The normal direction to plane 43 defines the insertion vector. The angle $\alpha$, which represents the rotation of the skew plane 42, is the insertion angle. In FIG. 8 the rotation carried out is for example of a convergence angle $\alpha$ of 5°. The same would apply in case of a skew angle is equal to zero, with a pure axial entry. In this case, the direction I will intersect the rotational axis R with an angle equal to $\alpha$.

The method for assembling the rotor assembly 1 and the operation thereof are as follows.

Figure 16:
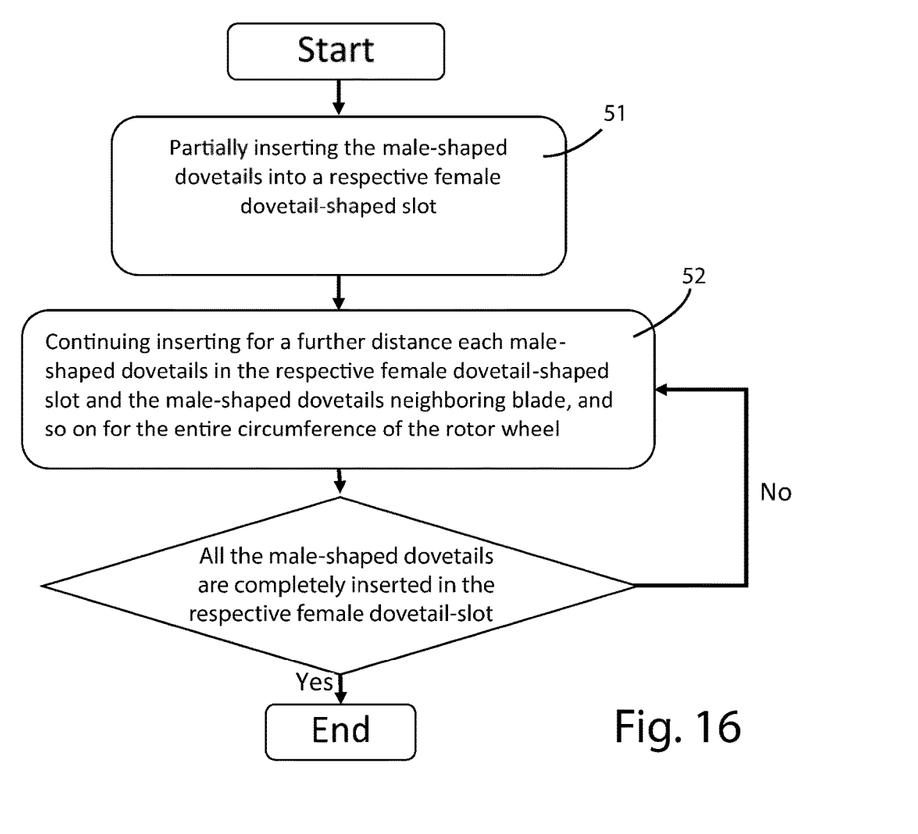
FIG. 16 illustrates a flow chart of a method for assembling the rotor assembly of the first embodiment.

With reference to FIGS. 9, 10, 11 and 12, and also referring to FIG. 16, a set of blades 3 can be seen, which male dovetails 32 have to be inserted each one in a relevant female dovetail slot 21, following the insertion direction of the shown arrow I.

The airfoil shroud interference is defined (in percentage) as:

$$\left(\frac{\text{Pitch}_{actual}}{\text{Pitch}_{theoretical}} - 1\right) \cdot 100 > 0$$

-continued

Where: $\text{Pitch}_{actual} = \text{Pitch}_{theoretical} + \text{extramaterial}$ The designed shroud interference can be between 0.1% and 10%.

The interference is obtained at the shroud mate surfaces during the assembly when the blades are completely inserted inside the slot, since the blades move toward a relative closer position during the insertion in the convergent slots. When there interference, the entire shroud array is tangentially compressed and the resulting shroud configuration is such to have the shrouds themselves twisted around the radial direction Z (see FIG. 11). In this condition the shroud array is capable to behave as a rigid continuous ring.

Figure 11:
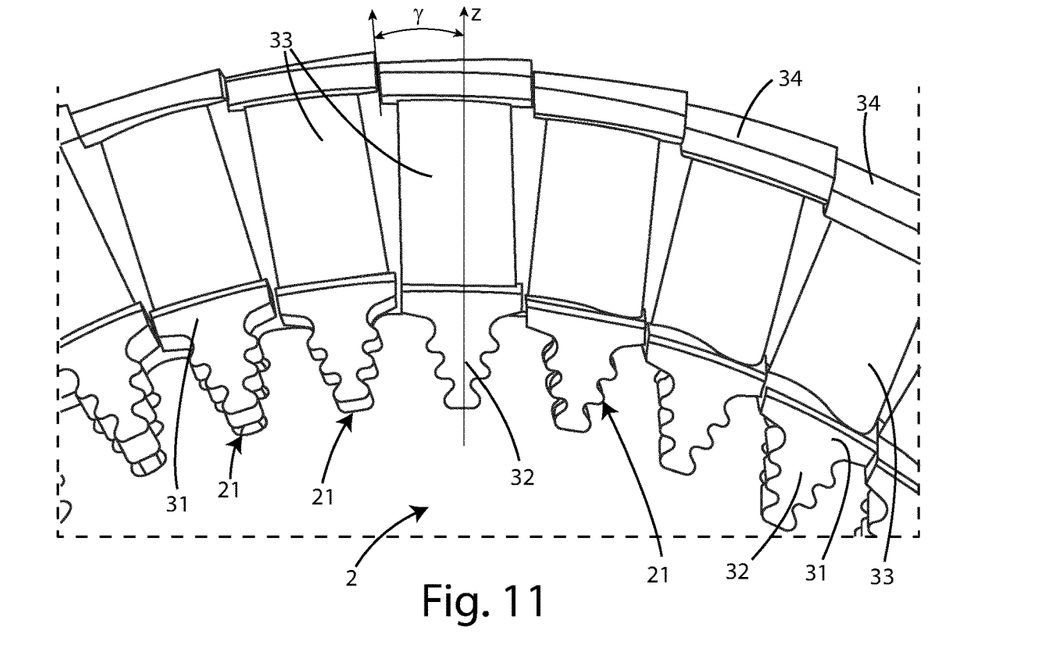
FIG. 11 describes a view, aligned with the insertion direction, of the rotor wheel and the blades before their insertion in the female dovetail slots, according to the first embodiment.
Figure 12:
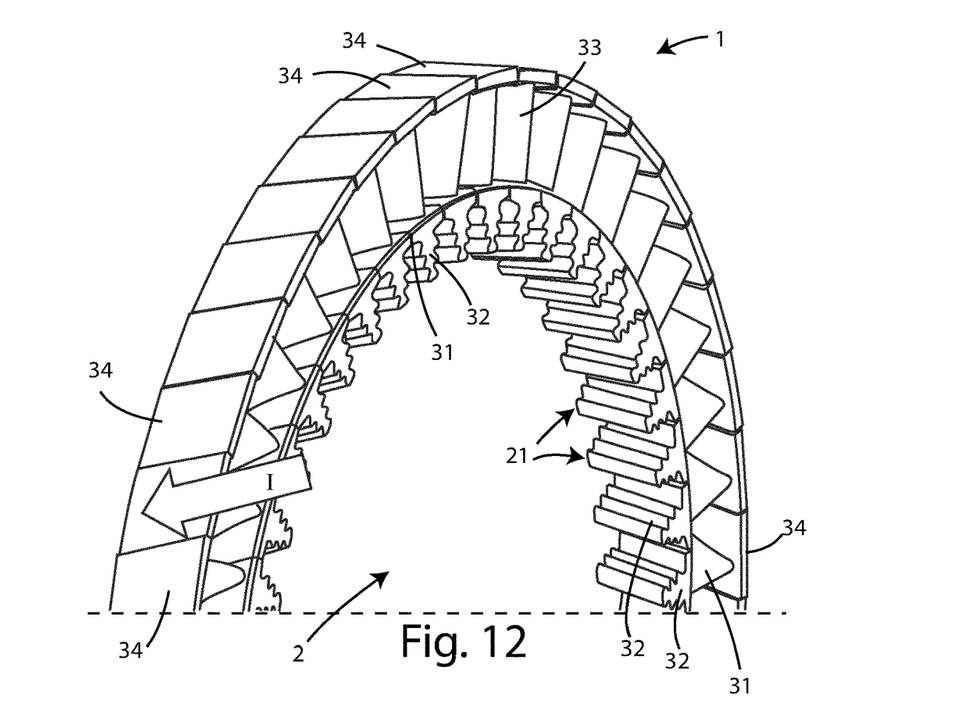
FIG. 12 illustrates a perspective view of the rotor wheel and the blades when the blades are partially inserted in the female dovetail slots of the rotor wheel, according to the first embodiment.
Figure 13:
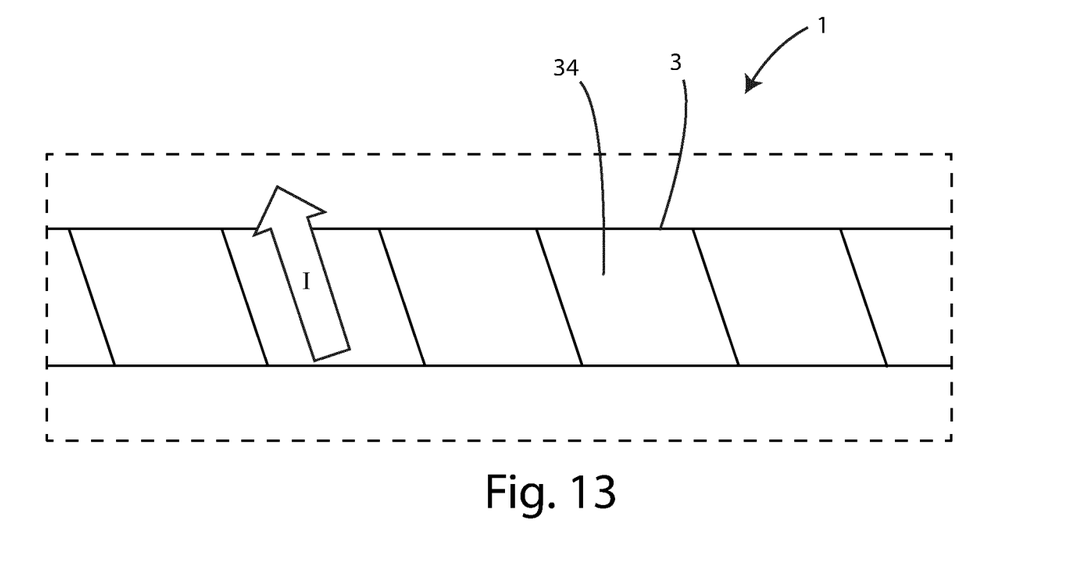
FIG. 13 illustrates a top view of the blades fully inserted in the female dovetail slots of the rotor wheel, according to the first embodiment.
Figure 14:
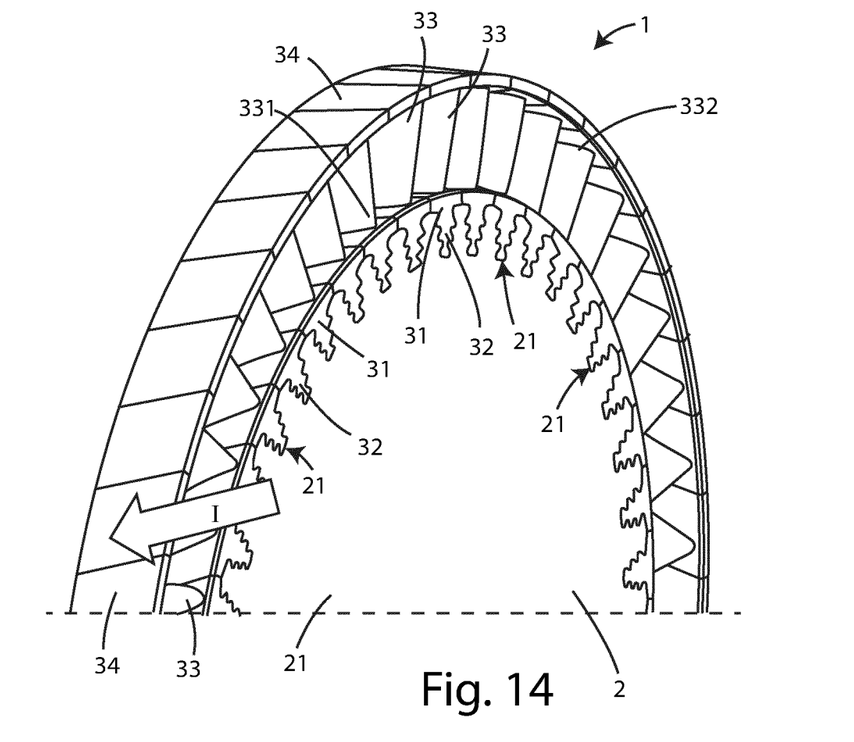
FIG. 14 illustrates a perspective view of the blades fully inserted in the female dovetail slots of the rotor wheel, according to the first embodiment.
Figure 15:
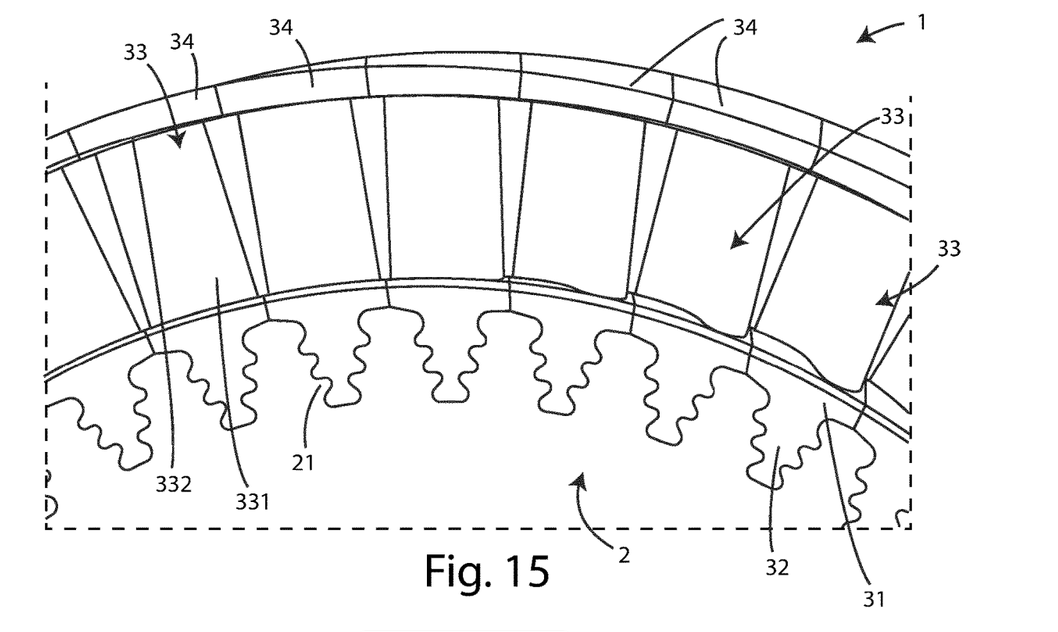
FIG. 15 illustrates a view, aligned with the insertion direction, of the blades inserted in the female dovetail slots of the rotor wheel, according to the first embodiment.

Referring in particular to FIG. 11, an interface angle $\gamma$ angle is shown, with respect to which two adjacent airfoil shrouds 34 interface. The interface angle $\gamma$ allows to further control the interference of the airfoil shrouds 34, thus representing an additional design option. Depending on the inclination of the $\gamma$ angle with respect to the radial direction Z the above-mentioned interference can increase or decrease. Therefore, by the combined evaluation of skew angle the convergence angle $\alpha$ and the interface angle $\gamma$ designing the interference of the stage is allowed.

Possible combinations that are able to give interference among the airfoil shrouds are the following:

$\alpha=0$ AND $\beta\neq0$ AND $\gamma\neq$radial; or
$\alpha\neq0$ AND $\beta\neq0$ AND $\gamma=$radial; or
$\alpha\neq0$ AND $\beta\neq0$ AND $\gamma\neq$radial; or
$\alpha\neq0$ AND $\beta=0$ AND $\gamma\neq$radial; or
$\alpha\neq0$ AND $\beta=0$ AND $\gamma=$radial.

Coming back to the insertion procedure, in a first step 51 (see FIG. 16), the male dovetails 32 of each blade 3 can be partially inserted into a relevant female dovetail slot 21. From a practical standpoint, this insertion is carried out by a user, by partially inserting one-by-one the male dovetail 32 of each blade 3. At this point, still clearance is present at shrouds interfaces. In particular, a first male dovetail 32 is inserted in a corresponding female dovetail slot 21 and a following one, in a further respective female dovetail slot 21, and so on. In this way, the airfoil shroud 34 of a blade 3 gets closer without contact, with the airfoil shroud 34 of the neighboring one.

However, owing to the insertion direction I, oriented along the convergence angle $\alpha$, which converges toward the rotation axis R of the rotor wheel 1, and the skew angle $\beta$, formed between the rotation axis R and the insertion direction I projected on a plane tangent to the diameter of the rotor wheel 22 passing through point P, when the male dovetail 32 of each blades 3 is not completely inserted in the female dovetail slot 21, each blade 3 and then also each airfoil shroud 34, remains a bit spaced from its neighboring blades 3, thus allowing, as said, to insert all the blades 3 in the female dovetail slots 21 of the rotor wheel 2. The partial interference of each airfoil shroud 34 with the neighboring ones is due to the angular arrangement of the insertion direction I with respect to the rotation axis R of the rotor wheel 2. In other words, owing to the insertion direction I is convergent to the rotation axis R as well as skewed, each airfoil shroud 34 at a certain moment gets in contact with the airfoil shroud 34 of the two neighboring blades 3, while the male dovetails 32 of each blade 3 is partially inserted into the female dovetail slot 21.

After that all the blades 3 are at least partially inserted and their shrouds 34 are in contact among them, the next neighboring blade 3 is again partially inserted (see step 52 of FIG. 16) for a further distance and so on for the entire circumference of the rotor wheel 2 of the rotor assembly 1. Then, the insertion of each blade 3 of the circular array is continued until all the blades 3 are completely inserted in the respective female dovetail slots 21. Because of the convergence angle α of the insertion direction I toward the rotation axis R of the rotor wheel 2, each blade 3 packs with the neighboring ones while progressively inserted in the respective female dovetail slots 21.

At the end of the insertion process, and referring now to FIGS. 13, 14, 15 and 16, all the male dovetails 32 of the blades 3 are completely inserted within the female dovetail slots 21 and the airfoil shroud 34 remain uniformly packed with each other with the designed shroud interference, so that, the airfoils 33 remain preloaded by having the shrouds 34 interfering each other so as to prevent the airfoils 33 to be stressed in freestanding modality by the steam pressure field during the operation of a steam turbine, wherein the rotor assembly 1 is installed.

The interference of the airfoil shroud 34 increase, while the male dovetails 32 of the whole circular array of the blades 3 are inserted in the female dovetail slots 21. The interference is lower at the initial partial insertion and increases while each male dovetails 32 is inserted. This technical effect is owed to the convergent insertion direction I, convergent toward the rotation axis R of the rotor wheel 2.

In some embodiments, the female dovetail slots 21 are shaped in ordered to allow an insertion direction of the male dovetail 32 along an axis which is converging toward the rotation axis of the rotor wheel 2 and at, the same time, the insertion direction lays in a plane containing also said rotation axis of the rotor wheel 2. In addition, the male dovetail 32 is a shaped so as to fit the particular shape of the relevant female dovetail slot 21.

When the assembly of the rotor assembly 1 is finished, an axial locking system or step is foreseen, to prevent that the blades 3, either under the force of the steam pressure during operation, or any other external forces, could slip out in the opposite direction to that of the insertion direction I. Therefore, normally a machining step is carried out on the rotor assembly 1 to lock the blades 3.

In some embodiment, this locking machining step provides mounting a single steel wire, arranged transversal to the direction I, which locks the blades 3 and prevent them from the extraction. In other embodiments, blocks are installed under each blade 3. In further embodiment, plates are mounted to be bent under the foot of each blade 3.

It is seen that any axial locking system of the blades 3 can be provided for blocking the blades 3 their position after the insertions procedure.

While aspects the invention has been described in terms of various specific embodiments, it will be apparent to those of ordinary skill in the art that many modifications, changes, and omissions are possible without departing from the spirt and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A rotary member assembly for a turbomachine operating with a fluid stream, the rotary member assembly comprising:
a rotor wheel having a peripheral rim and configured to rotate around a rotation axis, the rotor wheel comprising a plurality of circumferentially spaced female dovetail slots arranged about the peripheral rim;
a plurality of blades configured to intercept the fluid stream while the turbomachine operates, each blade comprising a male dovetail shaped to fit into one of the female dovetail slots of the rotor wheel along an insertion direction and an airfoil having a first end and a second end, the first end connected to the male dovetail; and
an airfoil shroud fixed to the second end of the airfoil, wherein each of the female dovetail slots is shaped so that the insertion direction is convergent with the rotation axis of the rotor wheel to form an insertion convergence angle so that the blade moves towards a closer position with respect to the rotor axis during insertion, and
wherein, when the male dovetail of each blade is inserted in the female dovetail slot, the airfoil shrouds of each blade contact each other.

2. The rotary member assembly of claim 1, wherein the insertion direction forms a skew angle with a plane containing the rotation axis of the rotor wheel.

3. The rotary member assembly according to claim 1, wherein each airfoil shroud has extra material on a mate side that interferes with an adjacent airfoil shroud when the male dovetail is completely inserted in the respective female dovetail slot of the rotor wheel.

4. The rotary member assembly of claim 3, wherein each blade comprises a platform coupled to the male dovetail and to the first end of the airfoil.

5. The rotary member assembly according to claim 1, wherein the airfoil shroud of each blade has a rhomboidal shape.

6. The rotary member assembly according to claim 1, wherein two adjacent airfoil shrouds interface to form an interface angle, and wherein the interface angle allows further control of interference of the airfoil shrouds depending on inclination of the interface angle with respect to a radial direction.

7. The rotary member assembly according to claim 1, wherein the female dovetail slots are uniformly spaced about the rotor wheel rim.

8. The rotary member assembly according to claim 1, wherein the female dovetail slots are fir tree shaped.

9. The rotary member assembly according to claim 1, wherein the rotor wheel is disk-shaped.

10. The rotary member assembly according to claim 1, wherein the male dovetail slots are fir tree shaped.

11. The rotary member assembly according to claim 1, wherein the female dovetail slots and the male dovetail slots are fir tree shaped.

12. A method for assembling a rotary member assembly, wherein the rotary member assembly comprising:
- a rotor wheel having a peripheral rim and configured to rotate around a rotation axis, wherein the rotor wheel has a plurality of circumferentially spaced female dovetail slots about the rim of the rotor wheel; and
- a plurality of blades configured to intercept a fluid stream while on a turbomachine,
- wherein each blade comprises a male dovetail shaped to fit with a corresponding female dovetail slot of the rotor wheel following an insertion direction,
- wherein the female dovetail slot is shaped so that the insertion direction of each male dovetail is convergent with the rotation axis of the rotor wheel to form with it an insertion convergence angle, wherein the method comprises the following steps:
- partially inserting the male dovetails of each blade into a respective female dovetail slot so that all the blades are at least partially inserted in the respective female dovetail slot,
- for each blade, continuing to insert each male dovetail into the respective female dovetail slot and male dovetails neighboring blades until the male dovetail of each blade is inserted completely in the respective female dovetail slot, and
- obtaining a designed airfoil shroud interference.

13. The method of claim 12, wherein the method comprises an axial locking step to prevent the blades from slipping out in the opposite direction to that of the insertion direction.

14. The method according to claim 12, wherein two adjacent airfoil shrouds interface at an interface angle, and wherein the interface angle allows further control of the interference of the airfoil shrouds depending on the inclination of the interface angle with respect to a radial direction.

15. A steam turbine, comprising:
- a rotor wheel having an outer peripheral edge with slots equally-spaced from one another about an axis of rotation; and
- blades coupled to the rotor wheel, one each disposed at one of the slots, the blades comprising:
  - an airfoil with a first end and a second end,
  - a platform coupled to the first end and having a root that matches the shape of the slots on the rotor wheel, and
  - an airfoil shroud coupled to the second end of the airfoil,
- wherein the shape of the slots on the rotor wheel are configured to orient the blades at an angle relative to the axis of rotation that converges toward the axis of rotation, and
- wherein the angle is configured to cause both sides of the airfoil shroud on adjacent blades to contact each other when the blades reside on the rotor wheel with the platform fully-inserted into the slot.

16. The steam turbine of claim 15, wherein the airfoil shroud of the blades has a rhomboidal shape.

17. The steam turbine of claim 15, wherein the airfoil shrouds of the blades have dimensions that are the same.

18. The steam turbine of claim 15, wherein the angle comprises a convergence angle that is not 0° and converges toward the axis of rotation and a skew angle that is not 0°, and wherein the skew angle is formed between a first plane normal to the axis of rotation and a second plane that is offset from the first plane about a Z-axis that is perpendicular to the axis of rotation and that extends radially through the slots of the rotor wheel.

19. The steam turbine of claim 15, wherein the slots have a shape that is fir tree shaped.

* * * * *